Figure 1:
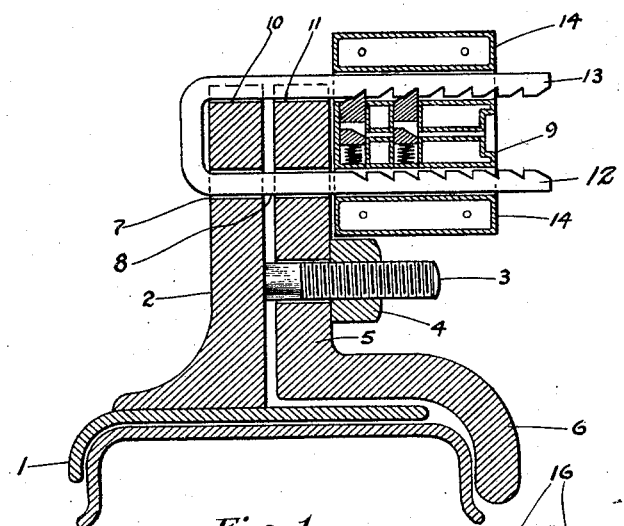

April 7, 1931.  R. A. LAVENDER  1,799,593

LOCKING MECHANISM

Filed Dec. 14, 1926

Robert A. Lavender
INVENTOR.

Patented Apr. 7, 1931

1,799,593

UNITED STATES PATENT OFFICE

ROBERT A. LAVENDER, OF WASHINGTON, DISTRICT OF COLUMBIA

LOCKING MECHANISM

Application filed December 14, 1926. Serial No. 154,825.

(GRANTED UNDER THE ACT OF MARCH 3, 1883, AS AMENDED APRIL 30, 1928; 370 O. G. 757)

My invention relates to the locking of anything that is normally secured by a bolt and tightening nut and particularly to types of spare tire locks utilizing a removable lug and padlock for holding the spare tire rim upon the spare tire carrier.

The object of my invention is to provide a spare tire lock that will supplement the securement, and prevent the loosening and removal of the tightening nut from the bolt that is inserted through the lug, and in this manner prevent the loosening of the lug so that it may be slipped to one side and the tire removed.

Further objects of my invention will appear more fully hereinafter.

My invention consists substantially in the construction, combination and arrangement of parts associated therewith or as will be more fully hereinafter set forth as shown by the accompanying drawings and finally pointed out in the appended claims.

In those types of spare tire locks of standard equipment on most automobiles of the present day, a lug carrying bolt is rigidly affixed to the inner surface of the spare tire carrier to which is secured by means of a nut a second removable lug. The two lugs are locked together by means of a padlock one arm of which is passed through holes in the two lugs, the other arm of the padlock resting in a groove in the upper end of the lugs.

It has been found, however, that the padlock is not arranged to prevent the removal of the tightening nut and that by reason thereof the upper lug may be removed from the bolt and to one side thereby permitting the removal of the spare tire without unlocking the padlock.

Figure 2:
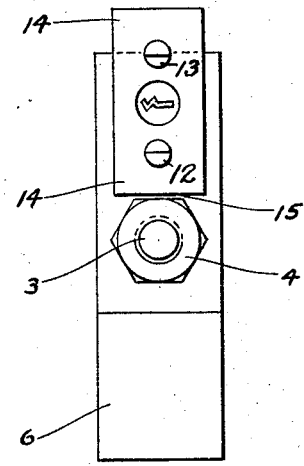
Figure 3:
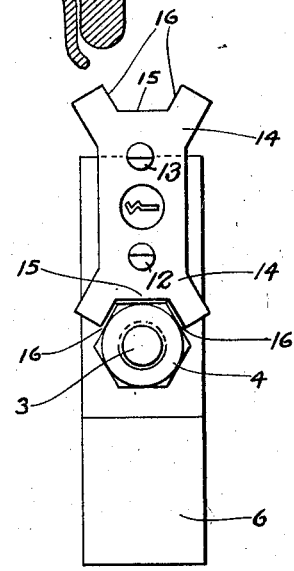

Reference is to be had to the accompanying drawings forming a part of this specification in which like reference characters indicate corresponding parts throughout the several views and in which:

Figure 1 represents a side elevation of the structure of the carrier and securing lugs and lock, Figure 2 is an elevational view of the arrangement shown in Figure 1, and Figure 3, represents a modification of the lock housing shown in a position similar to that of the lock in Figures 1 and 2.

Referring to Figure 1, 1 represents the spare tire carrier with lug 2 and bolt 3 rigidly attached thereto, 4 is a tightening nut adapted to be secured on the bolt. 5 is the removable lug which may have the lower portion 6 constructed in any standard manner, for holding the tire rim in a rigid position upon the carrier 1.

Through lugs 2 and 5 are drilled holes 7 and 8 respectively for the insertion of the arm 16 of a padlock 9. At the upper ends of the lugs 2 and 5 are grooves 10 and 11 respectively in which lies the other arm 13 of the padlock 9.

The lugs 2 and 5 are made sufficiently thick that the padlock 9 cannot be rotated about the lugs to allow the arm 13 to be removed from the grooves 10 and 11 in the upper ends of the lugs.

As shown in Figures 1 and 2 the distance between the aligned holes 7 and 8 and the upper flat surface of nut 10 is only sufficient to allow that portion 14 of the housing of padlock 9, when in position upon the arms, to fit tightly between the arm 12 and the nut 4. The portions 14 of the padlock are made with their surfaces flat as shown in Figure 2 in order that the surface when resting firmly against one of the flat surfaces of the nut 4 prevents the rotation of nut 4 by means of a wrench.

Figure 3 shows the modification in which portions 14 are constructed to form lugs extending from the sides of the usual shaped padlock and having surfaces 16 that correspond to the sloping sides of the nut 4 when the flat portion 15 is in contact with the horizontal surface of nut 4. The portions 16 thus form a hemihexagonal groove along the sides 19 of the lock and also form a more rigid padlock casing.

The details of the inner structure and operation of the padlock does not form a part of my invention as any locking mechanism with the arms 12 and 13 sufficiently straight to prevent the rotation of the lock out of the position with its one surface in contact with the nut 4 will suffice.

I am aware that locks have been made heretofore with the sides flat but my invention lies in the combination, cooperating juxtaposition and relationship of the entire structure as disclosed herein.

It will be understood that the above description and accompanying drawings comprehend only the general and preferred embodiment of my invention and that minor detail changes in construction and arrangement of parts may be made within the scope of the appended claims without sacrificing any of the advantages of my invention.

The invention herein described may be manufactured and used by or for the Government of the United States for governmental purposes without the payment to me of any royalty thereon or therefor.

What I claim is as follows:—

1. In combination with a spare tire carrier, a lug rigidly affixed thereto, a clamping lug adapted to be clamped against said lug, a bolt engaging both the lug and the clamping lug, a nut upon said bolt, means extending through both of said lugs for locking said lugs together, and means upon said locking means for engaging at least one of the surfaces of said nut to prevent rotation thereof.

2. In combination with a spare tire carrier, a lug affixed thereto, a clamping lug adapted to be clamped to said lug and prevent the removal of the spare tire, a bolt engaging both said lug and clamping lug, a nut on said bolt for securing said lugs together; locking means removably embracing and being maintained by both said lugs in substantially unvarying lateral relation to said bolt; and means lockable to said locking means in any of a plurality of positions for supplementally securing said lugs together and securing said nut from turning in each position it may be locked to said locking means.

3. In combination with a spare tire carrier adapted to carry a spare tire, of a member fixed upon said carrier, a movable member adapted to be juxtaposed to said fixed member and to extend over a portion of the space adapted to be occupied by said spare tire, two means each having a removable locking element and each means being mounted in such unvarying close lateral relation that their locking elements are adapted to interfere when securing said members in juxtaposed position adapted to prevent the removal of a spare tire, and one of which elements securing against release the other said element by bodily interference therewith until the release of said interfering element.

4. In combination with a spare tire carrier, a member affixed thereto, a securing member adapted to be removably secured to said member and having a portion adapted when in its secured position to extend over a portion of the space adapted to be occupied by a spare tire, a bolt engaging and being laterally maintained in position by said member and securing member, a nut on said bolt for securing said members together, locking means removably embracing and being maintained by both said members in substantially fixed lateral relation to said bolt, a casing, means in said casing for lockably securing said casing and locking means together in any of a plurality of positions with said casing juxtaposed to said securing member for supplementally securing both said members together, and means rigid with and upon each portion of the exterior surface of said casing adapted to be juxtaposed to said nut and to embrace a plurality of the sides of said nut in any of the plurality of positions in which said casing may be locked to said locking means for securing said nut from turning while said casing is locked.

5. In combination with a member adapted to be secured, two means each adapted to separately secure said member, one of said means having a removable locking element which when in its locking position is maintained in interference with the unlocking of the other securing means until the removal of said removable locking element.

6. In combination with a member adapted to be secured, a locking and a securing means each adapted to separately secure said member, each of said means having a removable securing element which when in their locking position are maintained in interference with the removal of the removable element of the securing means until the removable element of said locking means has first been removed.

ROBERT A. LAVENDER.